W. L. BAUER.
TIRE FASTENING DEVICE.
APPLICATION FILED JUNE 12, 1911.
1,037,414.
Patented Sept. 3, 1912.
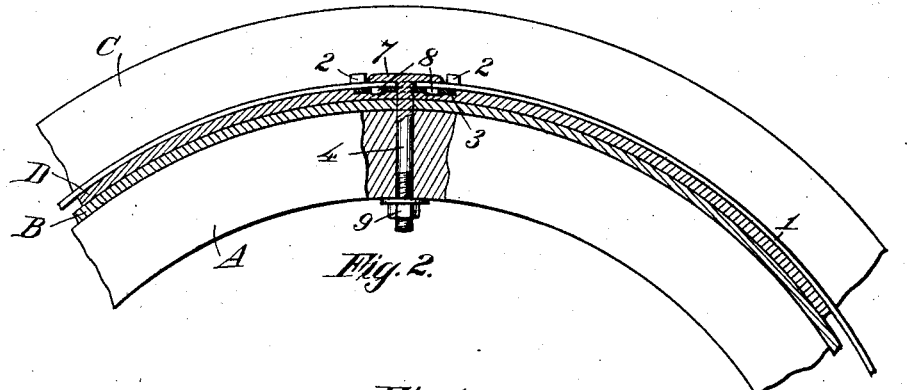
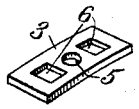
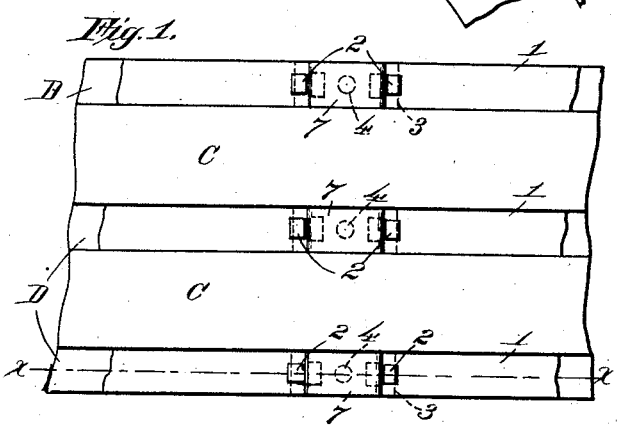
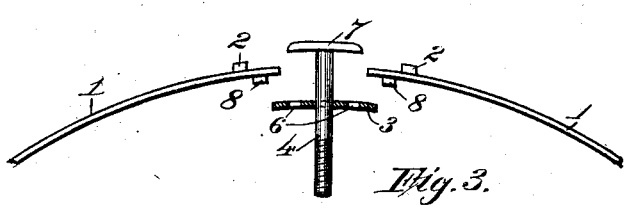
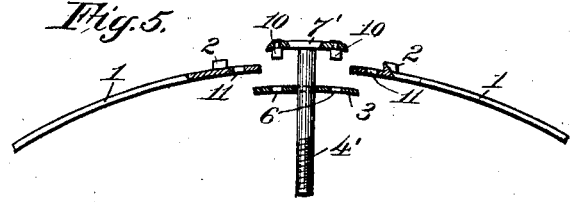
Witnesses
Inventor
William L. Bauer
By Joshua R. H. Potts
Attorney

UNITED STATES PATENT OFFICE.

WILLIAM LEOPOLD BAUER, OF COVINGTON, KENTUCKY.

TIRE-FASTENING DEVICE.

1,037,414.  Specification of Letters Patent.  Patented Sept. 3, 1912.

Application filed June 12, 1911. Serial No. 632,608.

*To all whom it may concern:*

Be it known that I, WILLIAM L. BAUER, a citizen of the United States, residing at Covington, county of Kenton, and State of Kentucky, have invented certain new and useful Improvements in Tire-Fastening Devices, of which the following is a specification.

My invention relates to wheels, and particularly to means for securing tires to the rim of the wheel. More particularly my invention has reference to a tire having a tread portion and a laterally extended base portion, and this application relates particularly to means for securing such a tire to the wheel.

The object of my invention is to provide a securing or fastening means for tires of the character above mentioned and which, when in position, will be securely locked and also lock the tire against accidental displacement.

A further object of my invention is to provide a fastening device as mentioned which will not injure the tire but which will protect the relatively thin base portion from injury.

Other objects will appear hereinafter.

With these objects in view my invention consists generally in a split ring or band adapted to encircle the base portion of a tire, a lock plate, means for locking the ends of said band to said plate and a T-bolt for holding said locking means in position, the stem of said bolt extending through the rim and felly of the wheel.

My invention further consists in a securing band as above mentioned provided with outwardly extending lugs adjacent the ends thereof and affording means for gripping the same with a tool for tightening the band.

My invention further consists in various details of construction and arrangements of parts all as will be fully described hereinafter and particularly pointed out in the claims.

My invention will be more readily understood by reference to the accompanying drawings forming a part of this specification and in which—

Figure 1 is a plan view of a portion of a tire and securing devices embodying my invention in its preferred form, illustrating the portion thereof provided with the locking means, Fig. 2 is a longitudinal section on the line x—x of Fig. 1, Fig. 3 is a detail view of the ends of the band, the lock plate and the fastening devices, the lock plate being shown in section, Fig. 4 is a perspective view of the lock plate and Fig. 5 is a view similar to Fig. 3 illustrating a modified form of the device.

Referring now to the drawings A indicates the felly of a wheel and B the rim which may be of any ordinary or preferred form. The tire comprises tread portions C and flat base portions D. The tire may consist of one or more tread portions C but in the drawings I have illustrated the tire as having two such portions.

The securing device forming the subject matter of the present application comprises a band 1 surrounding the base portion B of the tire, a band 1 being provided for each of said base portions, and tightly secured about the same to hold the tire firmly on the rim. Each band 1 is formed of a flat strip of metal bent into circular form, and provided adjacent their ends with outwardly extending lugs 2 which afford holds for a suitable tool for tightening the band. To lock the bands in position I provide a lock plate 3 and a T-bolt 4. The plate 3 either rests upon the outer face of the base portion of the tire or is embedded therein, and is provided with a central aperture 5 to receive the stem of the bolt and with apertures 6 to receive locking members, which members are held in position by the head 7 of the T-bolt.

The locking members may be formed either upon the bands 6 or upon the under face of the flat head 7 of the bolt, and in Figs. 1 to 4 inclusive I have illustrated the former construction and in Fig. 5 the latter. In either case the ends of the band are clamped between the head 7 and the plate 3. As illustrated in Figs. 1 to 4, the locking members comprise inwardly extending lugs 8 formed on the inner faces of the band 1 adjacent the ends of the band and adapted to engage in the aperture 6 of the lock plate. The shank of the bolt 4 extends through the rim and the felly of the wheel and the flat head 7 rests upon the ends of the band 1 thereby securely holding the lugs 8 in the apertures 6. 9 indicates a bur or nut threaded upon said bolt for holding the same securely in position.

As shown in Fig. 5 the locking members are provided on the head 7' of the T-bolt 4' and comprise lugs 10 which extend through apertures 11 formed in the band 1 adjacent the ends and the apertures 6 in the lock plate.

Having described my invention what I claim as new and desire to secure by Letters Patent is:

1. A tire fastening device comprising a flat band adapted to encircle the base portion of a tire, an inwardly projecting lug adjacent each end of said band, a lock plate adapted to rest on said base portion of the tire and provided with apertures to receive said lugs when said band is tightened about said base portion, said lugs being substantially the same length as the thickness of said plate, and means for maintaining said lugs within said apertures, substantially as described.

2. In a device of the class described, a securing band adapted to encircle the base portion of a tire, a pair of inwardly extending lugs on the ends of said band, a lock plate adapted to rest on the base portion of said tire and provided with apertures to receive said lugs when said band is tightened about said base portion and a T-bolt provided with a flat head for clamping the ends of said band between the same and said lock plate to maintain said lugs within said apertures, substantially as described.

In testimony whereof I have signed my name to this specification in the presence of two subscribing witnesses.

WILLIAM LEOPOLD BAUER.

Witnesses:
GEO. F. HEINTZ,
GEORGE L. LEY.

Copies of this patent may be obtained for five cents each, by addressing the "Commissioner of Patents, Washington, D. C."